US012576513B2

(12) United States Patent
Tomaru et al.

(10) Patent No.: US 12,576,513 B2
(45) Date of Patent: Mar. 17, 2026

(54) DRIVING APPARATUS AND INSPECTION SYSTEM

(71) Applicant: CANON DENSHI KABUSHIKI KAISHA, Saitama (JP)

(72) Inventors: Tomohiro Tomaru, Saitama (JP); Hiroyuki Saito, Saitama (JP); Takashi Arai, Saitama (JP); Takamasa Kuboki, Saitama (JP); Riku Nonaka, Gunma (JP); Taku Kamura, Saitama (JP); Taro Ebisugi, Saitama (JP); Hironobu Sato, Chiba (JP); Masaru Senda, Saitama (JP)

(73) Assignee: CANON DENSHI KABUSHIKI KAISHA, Saitama (JP)

( * ) Notice: Subject to any disclaimer, the term of this patent is extended or adjusted under 35 U.S.C. 154(b) by 0 days.

(21) Appl. No.: 18/958,584

(22) Filed: Nov. 25, 2024

(65) Prior Publication Data

US 2025/0170724 A1     May 29, 2025

(30) Foreign Application Priority Data

Nov. 27, 2023   (JP) ................................. 2023-200095
Oct. 3, 2024   (JP) ................................. 2024-174513

(51) Int. Cl.
*B25J 9/12*        (2006.01)
*B25J 9/10*        (2006.01)
*B25J 13/08*       (2006.01)

(52) U.S. Cl.
CPC .............. *B25J 9/126* (2013.01); *B25J 9/102* (2013.01); *B25J 13/088* (2013.01)

(58) Field of Classification Search
CPC . B25J 13/088; B25J 9/102; B25J 9/104; B25J 9/126; B25J 9/065; A61B 1/0057; A61B 34/71; A61B 2034/301
See application file for complete search history.

(56) References Cited

U.S. PATENT DOCUMENTS

| | | | | |
|---|---|---|---|---|
| 11,446,104 B2 * | 9/2022 | Adams | ................... | A61B 34/30 |
| 12,163,574 B2 * | 12/2024 | Shang | ................... | B25J 9/1035 |
| 2015/0105615 A1 | 4/2015 | Kato | | |
| 2019/0090722 A1 | 3/2019 | Kato | | |
| 2022/0125529 A1 * | 4/2022 | Kapadia | ................ | A61B 34/30 |
| 2023/0372666 A1 | 11/2023 | Iwasawa et al. | | |

(Continued)

FOREIGN PATENT DOCUMENTS

| | | |
|---|---|---|
| JP | 6157063 B2 | 7/2017 |
| JP | 2022-115015 A | 8/2022 |

(Continued)

*Primary Examiner* — Bobby Rushing, Jr.
(74) *Attorney, Agent, or Firm* — Canon U.S.A., Inc., IP Division

(57) ABSTRACT

A driving apparatus connectable to a driving target to be driven based on a plurality of powers, comprising a shaft body extending in a first direction, and a plurality of power generation units configured to generate the plurality of powers, respectively, and detachably attached to a periphery of the shaft body, wherein each power generation unit includes a power unit configured to generate power, a sensor unit configured to detect a state of the power generation unit, and a control unit configured to perform driving control of the power unit and externally output a signal of the sensor unit.

14 Claims, 17 Drawing Sheets

(56) References Cited

U.S. PATENT DOCUMENTS

| | | |
|---|---|---|
| 2024/0216089 A1 | 7/2024 | Niikawa et al. |
| 2024/0315681 A1 | 9/2024 | Oba et al. |
| 2024/0350771 A1 | 10/2024 | Iwasawa et al. |

FOREIGN PATENT DOCUMENTS

| | | |
|---|---|---|
| JP | 2023-047365 A | 4/2023 |
| JP | 2023-086218 A | 6/2023 |
| JP | 2023-103866 A | 7/2023 |
| JP | 2023-117519 A | 8/2023 |
| JP | 2023-121974 A | 9/2023 |
| JP | 2023-122727 A | 9/2023 |
| JP | 2023-127075 A | 9/2023 |
| JP | 2023-130101 A | 9/2023 |

* cited by examiner

1125

1124b

1121

1123

1123

1123

1123

112

1122

1122e

OP3

1124a

Y

Z

X

F I G.  12
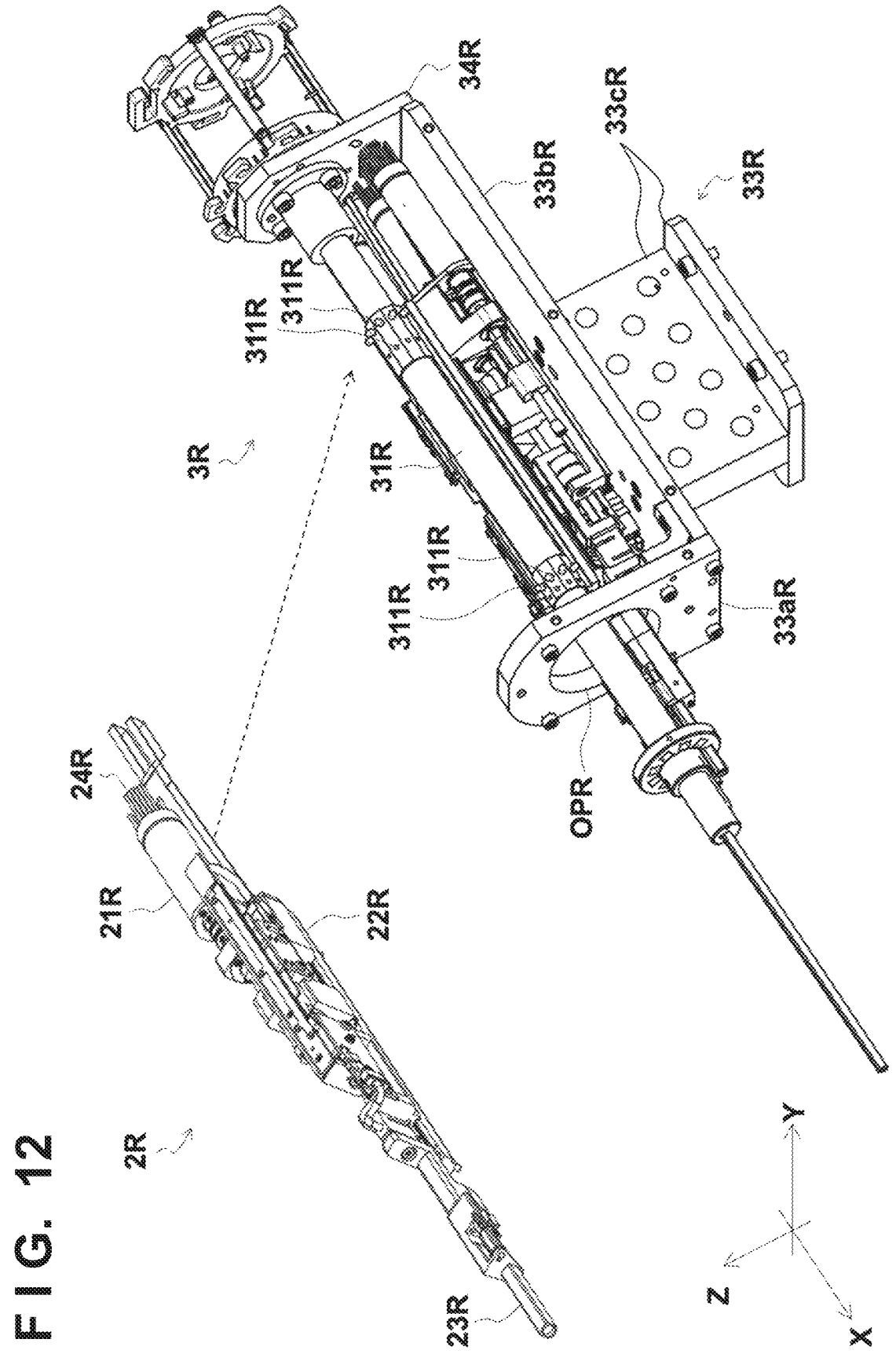

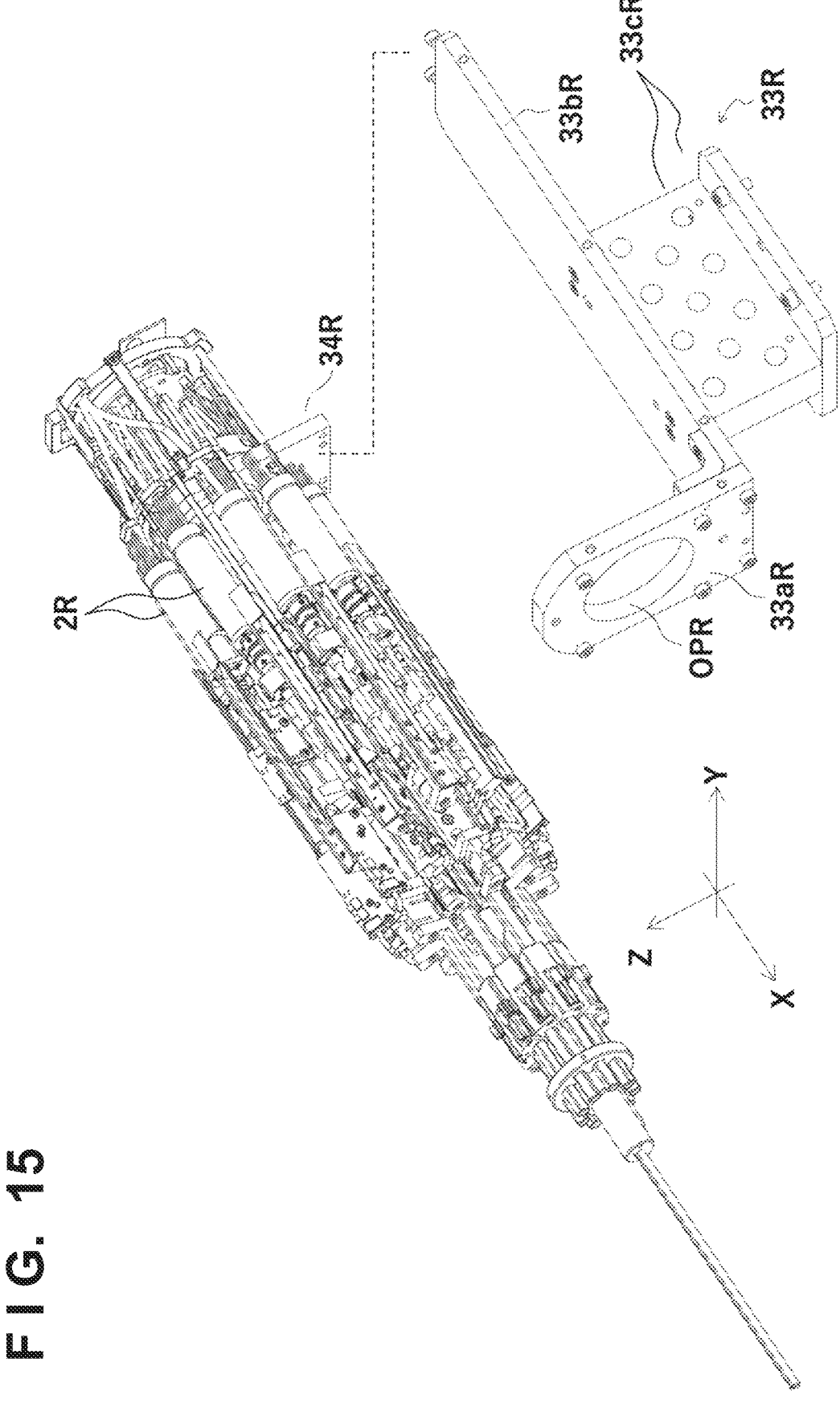
F I G. 15

F I G. 17
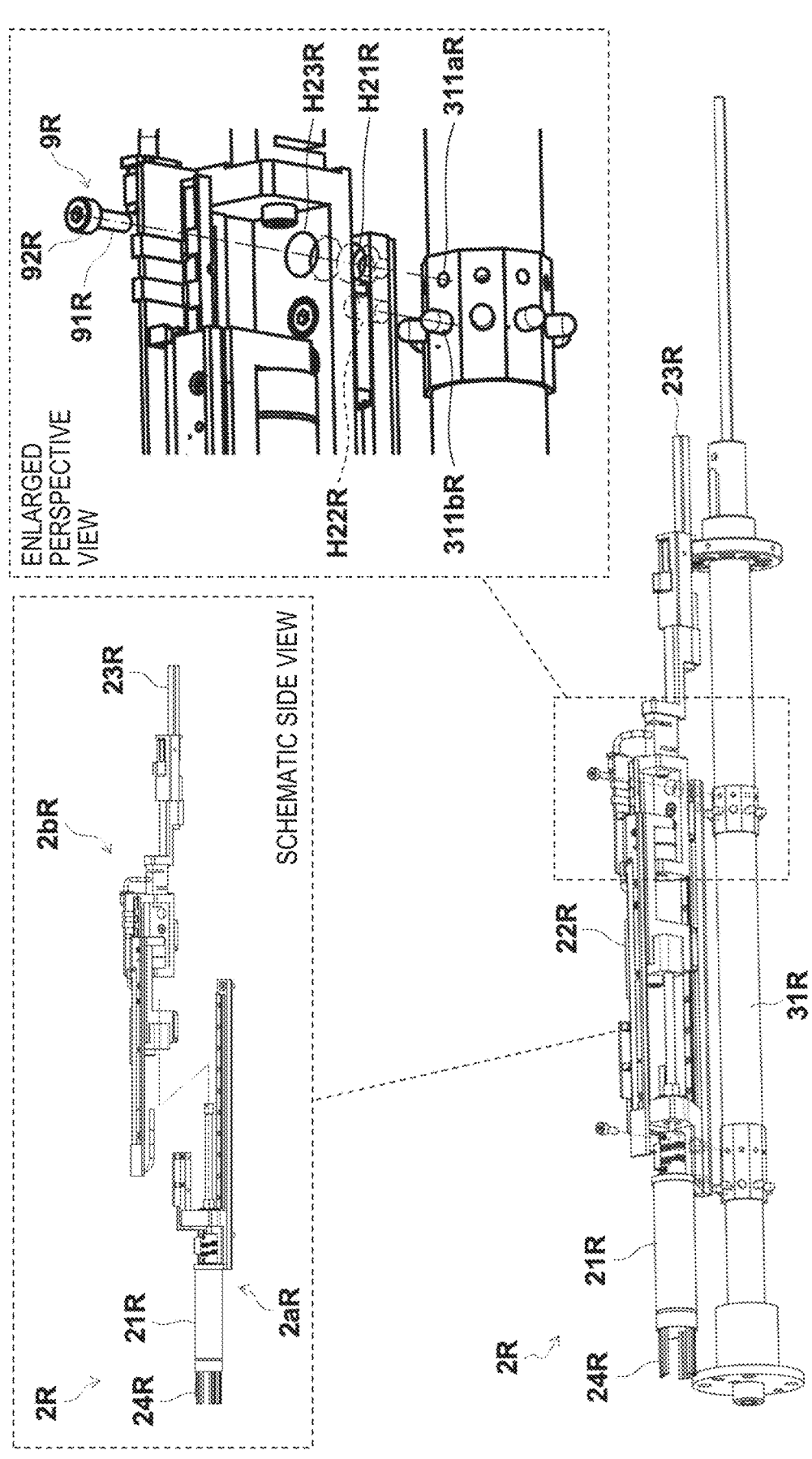
ENLARGED
PERSPECTIVE
VIEW
SCHEMATIC SIDE VIEW

DRIVING APPARATUS AND INSPECTION SYSTEM

CROSS-REFERENCE TO RELATED APPLICATION(S)

This application claims priority to and the benefit of Japanese Patent Application No. 2023-200095, filed Nov. 27, 2023, and Japanese Patent Application No. 2024-174513, filed Oct. 3, 2024, the entire disclosures of which are incorporated herein by reference.

BACKGROUND OF THE DISCLOSURE

Field of the Disclosure

The present disclosure mainly relates to a driving apparatus.

Description of the Related Art

Some driving apparatuses output a plurality of powers for transforming a driving target (see Japanese Patent Laid-Open Nos. 2023-130101, 2023-127075, and 2023-086218). Such driving apparatus includes a plurality of power generation units that can generate the plurality of powers, respectively, and drives the driving target in a desired form by individually controlling the power generation units.

Since the structure of the above-described driving apparatus tends to be complex, it can generally be required to improve the structure into a simpler structure to implement relatively easy handling.

SUMMARY OF THE DISCLOSURE

The present disclosure forms a driving apparatus for outputting a plurality of powers to be relatively easily handled.

One of the aspects of the present disclosure provides a driving apparatus connectable to a driving target to be driven based on a plurality of powers, comprising a shaft body extending in a first direction, and a plurality of power generation units configured to generate the plurality of powers, respectively, and detachably attached to a periphery of the shaft body, wherein each power generation unit includes a power unit configured to generate power, a sensor unit configured to detect a state of the power generation unit, and a control unit configured to perform driving control of the power unit and externally output a signal of the sensor unit.

Further features of the present disclosure will become apparent from the following description of exemplary embodiments (with reference to the attached drawings).

BRIEF DESCRIPTION OF THE DRAWINGS

FIG. 12 is an overall perspective view showing an example of the structure of a structure;

FIG. 15 is an overall perspective view showing an example of the structure of a support body;

FIGS. 16A and 16B are overall perspective views each showing an example of the structure of a single power generation unit; and FIG. 17 is a schematic view showing a detailed structure of the single power generation unit.

DESCRIPTION OF THE EMBODIMENTS

Figure 1:
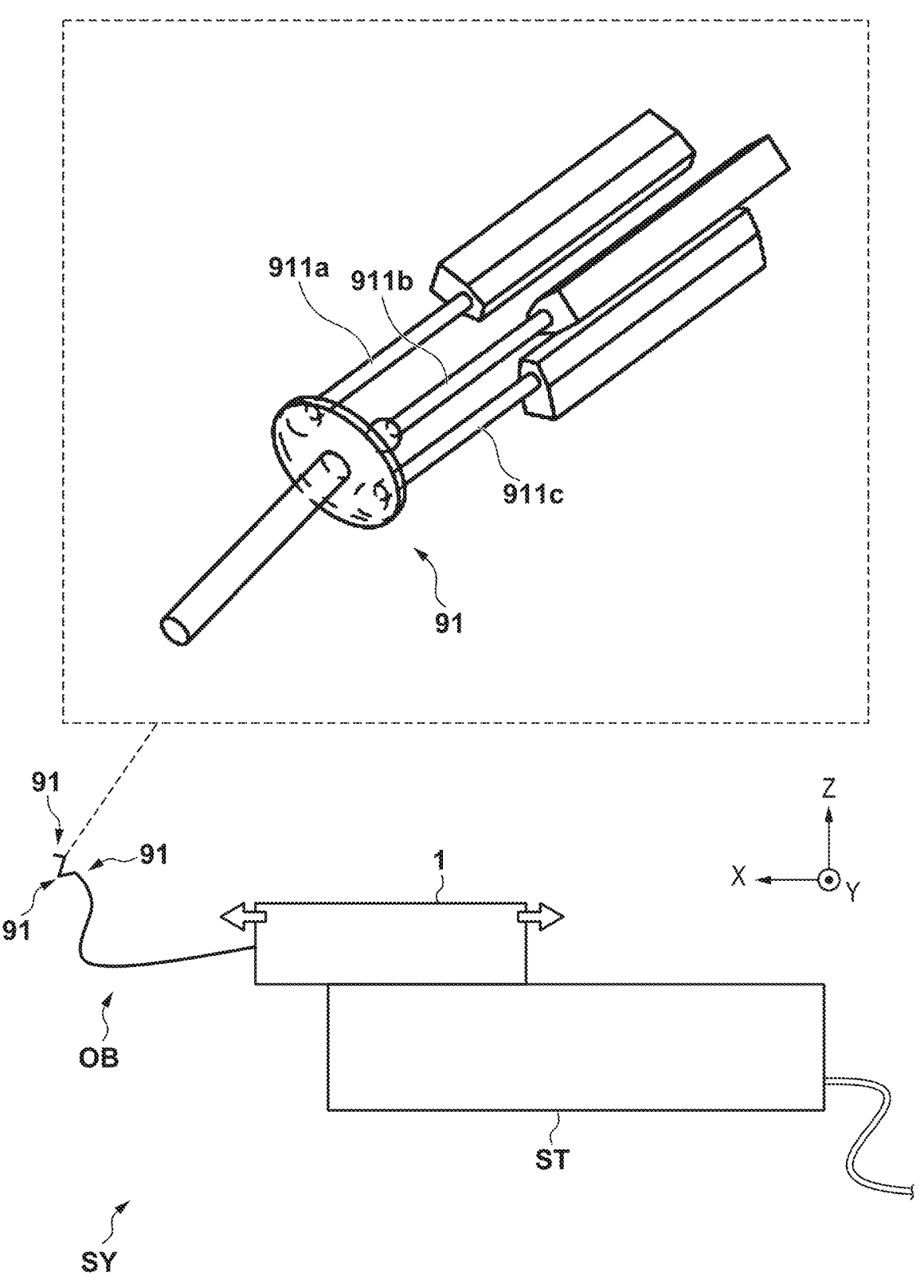
FIG. 1 is a schematic view showing the overall configuration of a robot system.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

<Robot System>

FIG. 1 is a schematic view showing the overall configuration of a robot system SY according to the first embodiment. The robot system SY includes a driving apparatus 1 and a stage ST that holds the driving apparatus 1 to be reciprocally movable. The driving apparatus 1 is connected to a wire driving manipulator OB as a driving target. The wire driving manipulator OB includes N movable portions 91 where N is a natural number of 2 or more (in this example, N=3). Each movable portion 91 is movable based on three kinds of control signals, and the control signals can be used to change an arbitrary direction by pushing/pulling three kinds of wires 911a to 911c.

The driving apparatus 1 can change the posture of the wire driving manipulator OB based on a plurality (in this example, 3×N (=9)) of powers. A work unit (for example, a camera) (not shown) is attached to the distal end portion of the wire driving manipulator OB, thereby making it possible to implement a work such as image capturing. This robot system SY can be applied to a work system, an inspection system, and the like.

For the sake of easy understanding, X, Y, and Z directions crossing each other (substantially, orthogonal to each other) are indicated, and the same applies to other drawings to be described later. The X direction corresponds to the left-right direction, the Y direction corresponds to the front-back direction, and the Z direction corresponds to the vertical direction. The X, Y, and Z directions are merely exemplified to facilitate a description of relative positional relationships between elements. In this example, the X and Y directions form a horizontal plane but may form an inclined plane.

Note that "+" and "−" may be added since it is necessary to distinguish between one side and the other side with respect to any of the X, Y, and Z directions in the following description (for example, the −X side indicates the left side and the +X side indicates the right side), but "+" and "−" are omitted unless it is necessary to discriminate between them.

This embodiment assumes that the stage ST holds the driving apparatus 1 to be reciprocally movable in the X direction.

<Example of Structure of Driving Apparatus>

Figure 2:
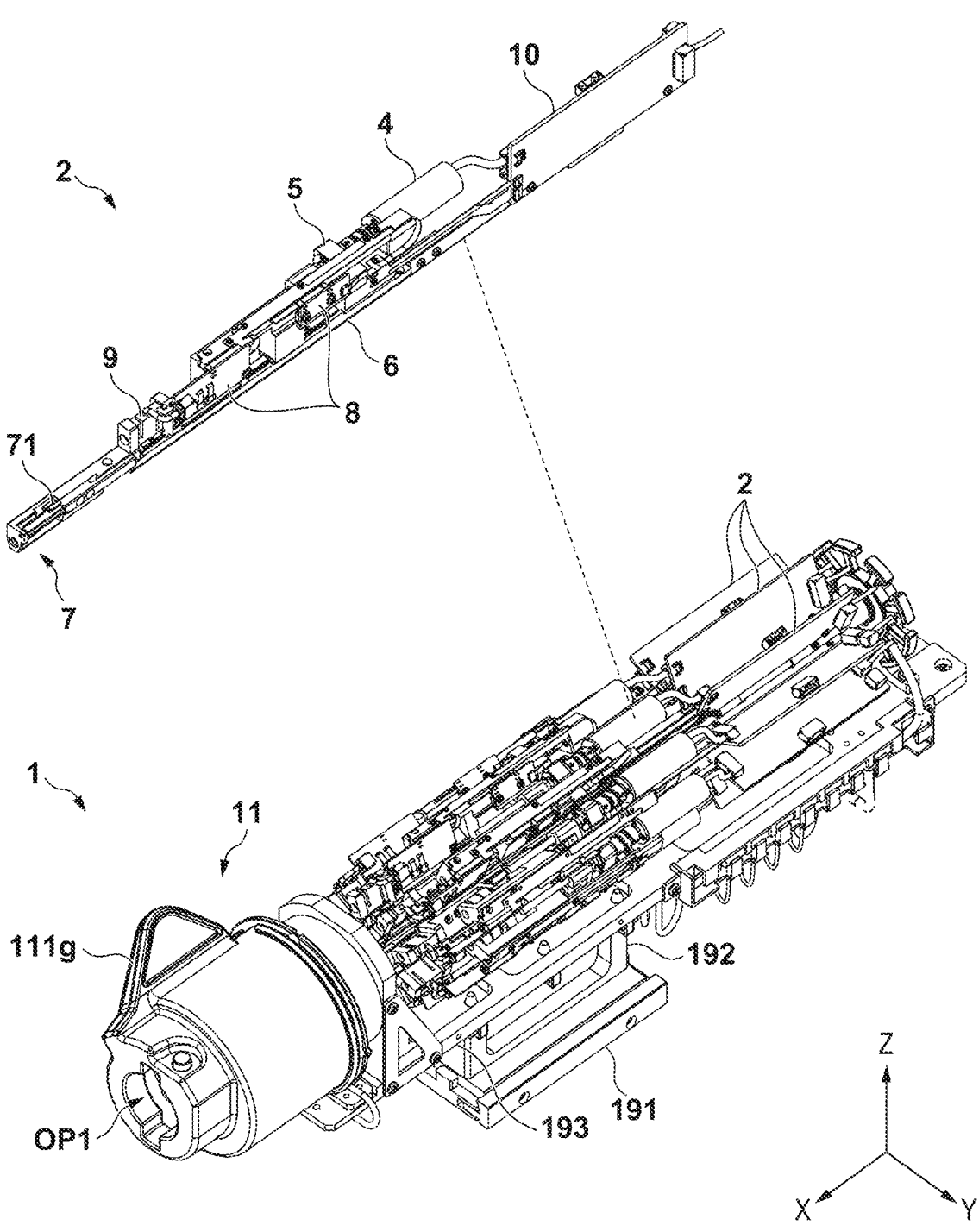
FIG. 2 is an overall perspective view of a driving apparatus.

FIG. 2 is an overall perspective view of the driving apparatus 1. The driving apparatus 1 includes a plurality (in this example, 3×N (=9)) of power generation units 2. The plurality of power generation units 2 are positioned by pins or pin holes provided on the surface of a shaft body 3 (see FIG. 4) (to be described later), and are attached to the periphery of the shaft body 3.

As shown in a partially enlarged view of FIG. 2, each power generation unit 2 includes a power unit 4, a moving body 5, a guide member 6, a driving target connection portion 7, a position sensor 8, an external force detection sensor 9, and a control unit 10.

The power unit 4 is a power source that generates power (rotation), and an electric motor such as a brushless DC motor is typically used.

The moving body 5 is reciprocally movable in the X direction based on the power of the power unit 4. This is implemented by, for example, a slider mechanism that threadably engages with a ball screw shaft or lead screw connected to the power unit 4.

The guide member 6 guides the driving target connection portion 7 to be reciprocally movable in the X direction along with the reciprocal movement of the moving body 5.

The driving target connection portion 7 connects the wire driving manipulator OB as a driving target, and can lock the wire driving manipulator OB by a locking portion 71 provided at the distal end of itself. With this structure, the driving target connection portion 7 functions as a power output unit that outputs the power of the power unit 4, and can push/pull a corresponding one of the wires 911a to 911c.

The position sensor 8 can detect the position of the driving target connection portion 7, and more specifically, the position of the moving body 5 with respect to the power unit 4. The external force detection sensor 9 can detect an external force applied to the driving target connection portion 7, and more specifically, an external force received from the wire driving manipulator OB.

In the power generation unit 2, a sensor unit that can detect the state of the power generation unit 2 is arranged, and another sensor unit may be arranged in addition to/instead of the position sensor 8 and/or the external force detection sensor 9. The state of the power generation unit 2 may indicate a direct state representing the state of each element of the power generation unit 2, or an indirect state representing the state of another element associated with each element.

The control unit 10 controls a system in the power generation unit 2 in which the control unit 10 is provided. That is, the control unit 10 performs driving control of each element described above. For example, the control unit 10 can perform driving control of the power unit 4, and can typically drive the power unit 4 by PWM (Pulse Width Modulation) control. Furthermore, the control unit 10 can externally output signals of the position sensor 8 and the external force detection sensor 9 and, for example, can feed back the detection results of the position sensor 8 and the external force detection sensor 9 to a main control unit 85 (see FIG. 9) (to be described later).

As shown in FIG. 2, the driving apparatus 1 further includes a connection mechanism 11.

Figure 3:
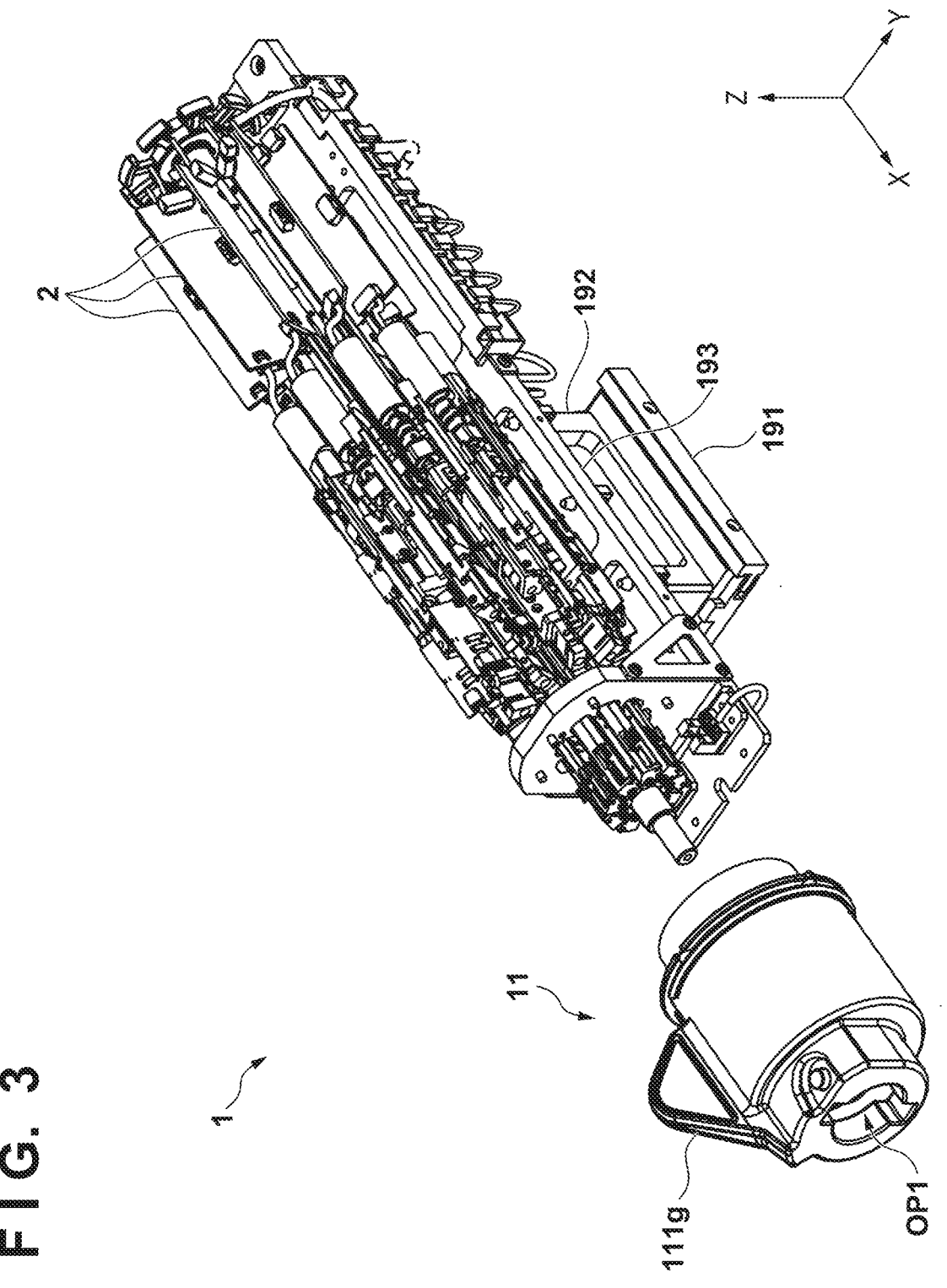
FIG. 3 is an overall perspective view showing a state in which a connection mechanism is detached from the driving apparatus.

FIG. 3 is an overall perspective view showing a state in which the connection mechanism 11 is detached from FIG. 2. Although details will be described later, the connection mechanism 11 includes a grip portion 111g, and can complete connection of the wire driving manipulator OB inserted into an opening OP1 by pivoting the grip portion 111g about the X direction.

Figure 4:
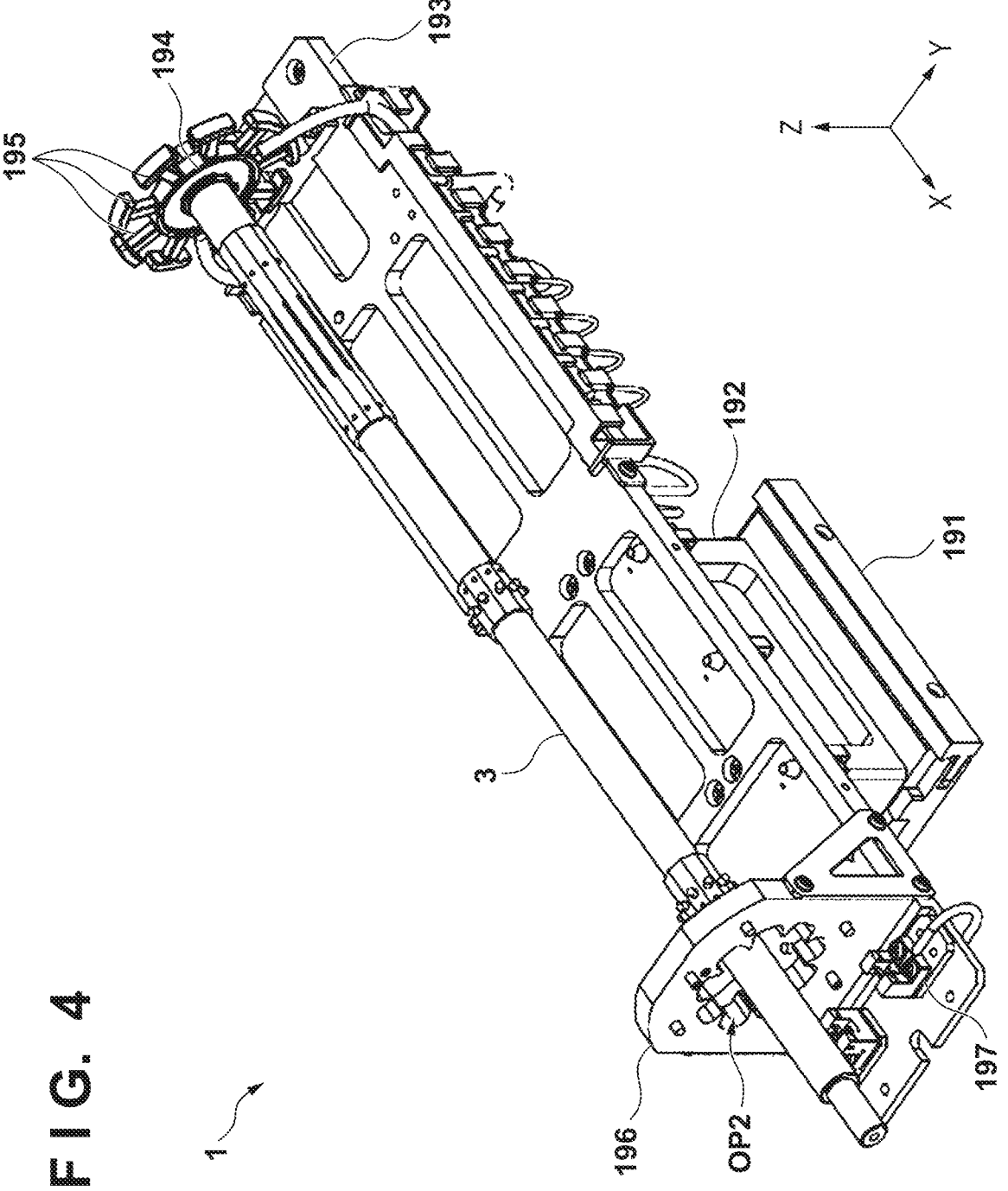
FIG. 4 is an overall perspective view showing a state in which power generation units are detached from the driving apparatus.

FIG. 4 is an overall perspective view showing a state in which the plurality of power generation units 2 are further detached from FIG. 3. The driving apparatus 1 further includes a base 191, a support column 192, a support base material 193, a support member 194, a plurality of extending portions 195, an attachment plate material 196, and a connection detection sensor 197.

The base 191 is slidably provided in the stage ST, and is reciprocally movable in the X direction by a known slider mechanism. The support column 192 is provided on the upper surface (a surface on the +Z side) of the base 191, and supports the support base material 193. The support base material 193 supports the support member 194 by a −X-side end portion while supporting the attachment plate material 196 and the connection detection sensor 197 by a +X-side end portion. The support member 194 fixes the shaft body 3 extending in the X direction in a vertical posture to be supportable by the −X-side end portion. The plurality of extending portions 195 extend outward from the shaft body 3, and can hold signal lines, and details thereof will be described later. The attachment plate material 196 includes an opening OP2, and is fixed in a vertical posture to be able to receive the plurality of power generation units 2 by the opening OP2. Furthermore, the connection detection sensor 197 is fixed on the +X side of the attachment plate material 196, and can detect connection by the connection mechanism 11, and details thereof will be described later.

Figure 5:
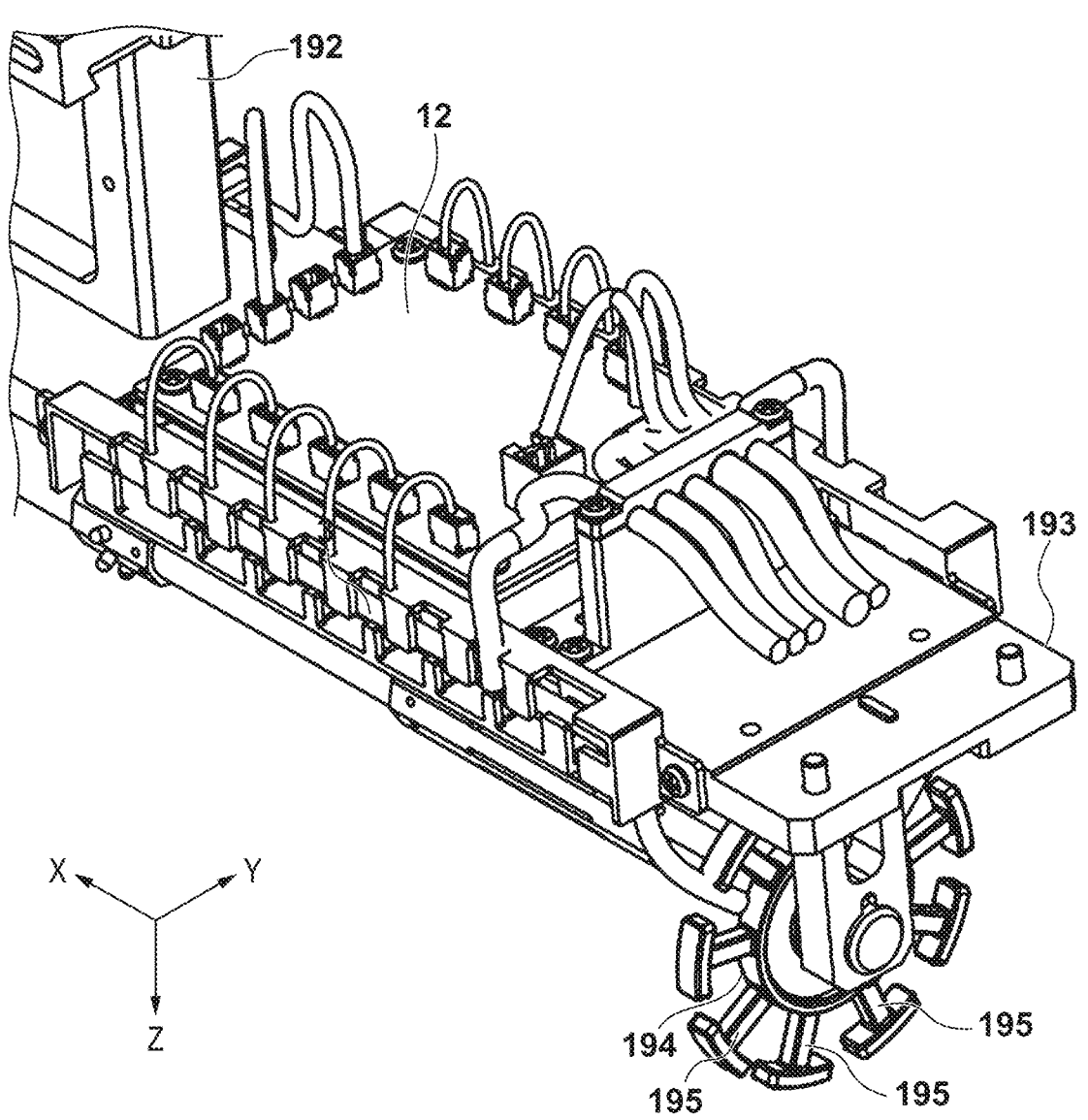
FIG. 5 is a partially enlarged perspective view when viewing FIG. 4 from below.

FIG. 5 is a partially enlarged perspective view showing FIG. 4 from another viewpoint. A power control unit 12 is attached to the lower surface (a surface on the −Z side) of the support base material 193. Although details will be described later, the power control unit 12 generates corresponding power to be supplied to each element of the driving apparatus 1 based on power from an external power supply 89 (see FIG. 9) (to be described later). For example, the power control unit 12 is connected to the control unit 10 of each power generation unit 2 by a predetermined power line, and can supply power to the control unit 10.

<Example of Structure of Connection Mechanism>

Figure 6:
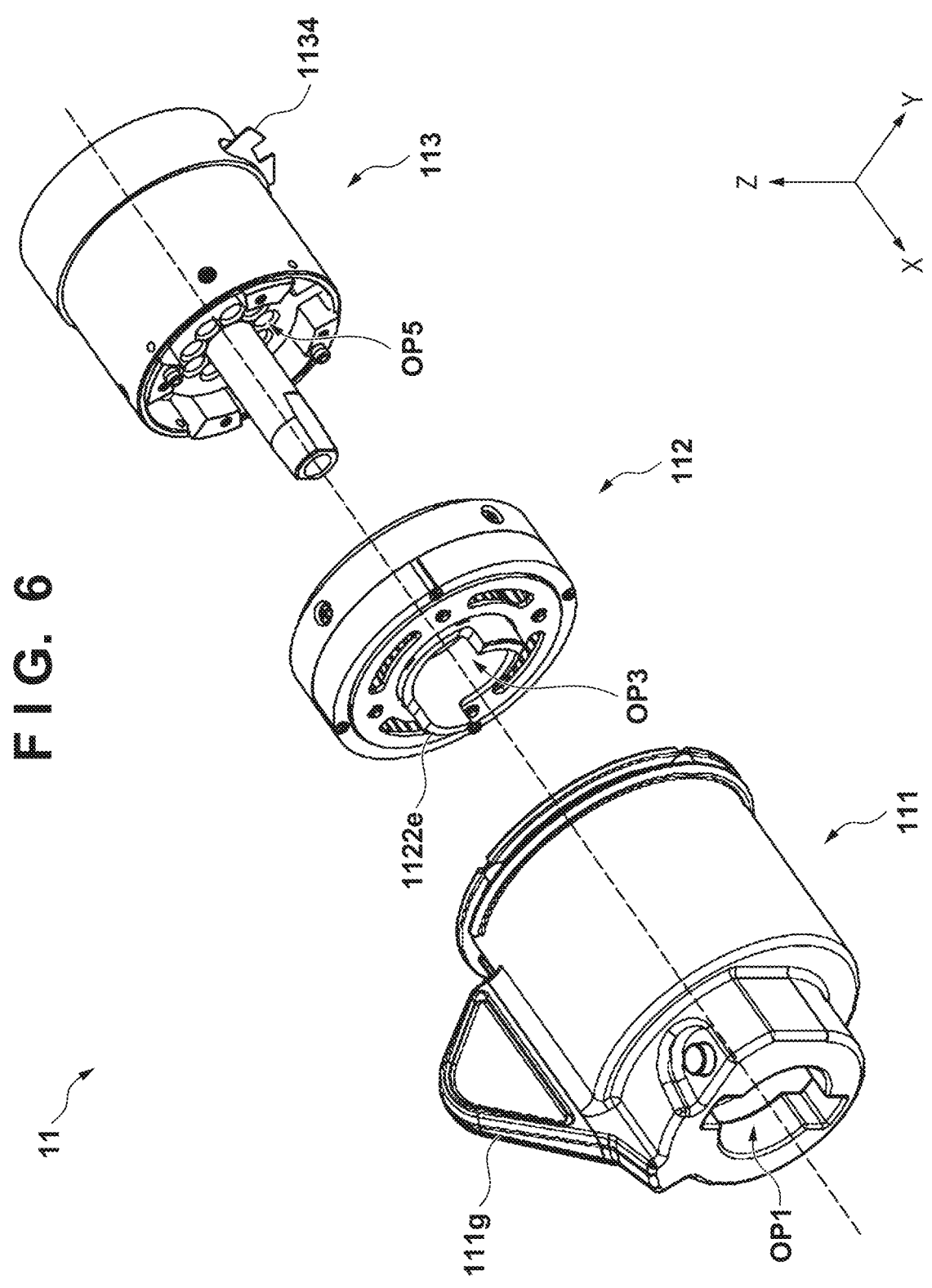
FIG. 6 is an exploded view of the connection mechanism.

FIG. 6 is an exploded view of the connection mechanism 11. The connection mechanism 11 includes an outer cylindrical member 111, a pivot mechanism 112, and a locking mechanism 113.

The outer cylindrical member 111 has a shape (cup shape) that is open on the −X side to be able to accommodate the pivot mechanism 112 and the locking mechanism 113. In addition, the outer cylindrical member 111 includes, on the +X side, the opening OP1 for receiving a plurality (in this example, nine) of connection terminals of the wire driving manipulator OB to receive a plurality of powers, respectively.

The above-described grip portion 111g is provided on the outer wall surface of the outer cylindrical member 111. Note that the grip portion 111g need only have such shape that the user can readily pivot the outer cylindrical member 111 while gripping the grip portion 111g, and may have another shape.

Figure 7:
FIG. 7 is an exploded view of a pivot mechanism.

FIG. 7 is an exploded view of the pivot mechanism 112. The pivot mechanism 112 includes an internal gear 1121, a sun gear 1122, a plurality (in this example, four) of planetary gears 1123, flat plates 1124a and 1124b, and an annular member 1125.

The internal gear 1121 and the sun gear 1122 are arranged with respect to the X direction as the central axis. The internal gear 1121 is fixed to the annular member 1125. That is, the internal gear 1121 does not rotate.

The sun gear 1122 includes, in a central portion, an opening OP3 for receiving the plurality of connection terminals of the wire driving manipulator OB. A pair of extending portions 1122e extending in the X direction is provided in the outer peripheral portion of the opening OP3, and the sun gear 1122 engages with the outer cylindrical member 111. This allows the sun gear 1122 to pivot along with the pivot of the outer cylindrical member 111.

The plurality of planetary gears 1123 are arranged between the internal gear 1121 and the sun gear 1122 (inside the internal gear 1121 and outside the sun gear 1122) to mesh with them. Each planetary gear 1123 is sandwiched by the flat plates 1124a and 1124b in the X direction, and is axially supported by each of the flat plates 1124a and 1124b to be rotatable.

Such gear structure is fixed to the annular member 1125 using screws, pins, washers, and the like, as indicated by broken lines in FIG. 7. When the user pivots the outer cylindrical member 111, the sun gear 1122 pivots, and each planetary gear 1123 accordingly rotates (revolves) around the sun gear 1122 while rotating (on its own axis). Furthermore, the flat plates 1124a and 1124b pivot about the X-axis along with the revolution of the planetary gears 1123.

Figure 8:
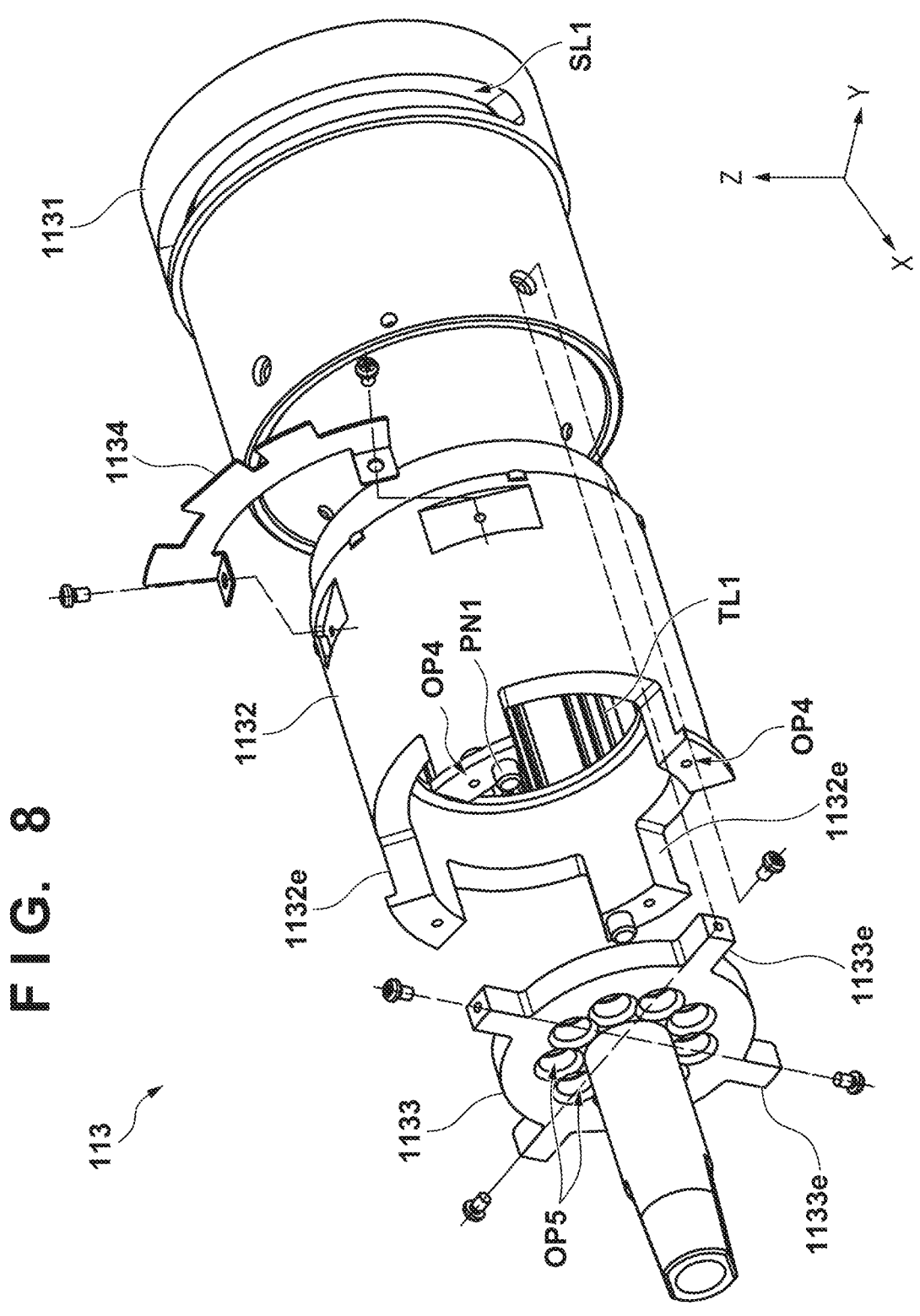
FIG. 8 is an exploded view of a locking mechanism.

FIG. 8 is an exploded view of the locking mechanism 113. The locking mechanism 113 includes an inner cylindrical member 1131, a pivoting cylindrical member 1132, and an insertion member 1133.

The inner cylindrical member 1131 can accommodate the pivoting cylindrical member 1132 and the insertion member 1133, and is provided with a slit SL1 on the side surface of a –X-side end portion, and details thereof will be described later. The inner cylindrical member 1131 is covered with the outer cylindrical member 111 that accommodates the pivot mechanism 112 and fixed to the attachment plate material 196 in the –X-side end portion while accommodating the pivoting cylindrical member 1132 and the insertion member 1133.

The pivoting cylindrical member 1132 includes a plurality (in this example, four) extending portions 1132e fixed to a flat plate 1124b, and each extending portion 1132e is provided with a screw hole OP4 fixed to the flat plate 1124b by a screw. Each of some (in this example, two) of the extending portions 1132e are provided with a pin PN1 that can engage with the flat plate 1124b. The pivoting cylindrical member 1132 can pivot together with the flat plate 1124b along with the revolution of the planetary gears 1123.

In addition, a plate member 1134 is attached to the side surface of the –X-side end portion of the pivoting cylindrical member 1132, and the pivoting cylindrical member 1132 is accommodated by the inner cylindrical member 1131 so that the plate member 1134 is inserted into the slit SL1. Thus, when the pivoting cylindrical member 1132 pivots, the plate member 1134 pivots along the slit SL1.

In the inner wall of the pivoting cylindrical member 1132, a plurality of locking grooves TL1 each of which can engage with the locking portion 71 provided at the distal end of the driving target connection portion 7 are provided. Thus, when the pivoting cylindrical member 1132 pivots, the locking portion 71 pivots to switch between a locked state and an unlocked state, thereby locking or unlocking the wire driving manipulator OB.

The insertion member 1133 includes a plurality (in this example, nine) of insertion holes OP5 that can receive the plurality of connection terminals of the wire driving manipulator OB, respectively.

The insertion member 1133 includes a plurality (in this example, four) of extending portions 1133e which are arranged so that the corresponding extending portion 1133e is located between two extending portions 1132e adjacent to each other in the pivoting cylindrical member 1132. The insertion member 1133 is fixed inside the inner cylindrical member 1131, and the pivot range of the pivoting cylindrical member 1132 is restricted by the extending portions 1133e of the insertion member 1133.

In summary, when the user pivots the outer cylindrical member 111 while gripping the grip portion 111g, the sun gear 1122 pivots, the plurality of planetary gears 1123 accordingly revolve to pivot the pivoting cylindrical member 1132, and then the locking portion 71 that engages with the locking groove TL1 is switched, thereby locking or unlocking the wire driving manipulator OB. At this time, the plate member 1134 pivots along the slit SL1. The connection detection sensor 197 detects connection by the connection mechanism 11 based on the passing of the pivoting plate member 1134.

The gear mechanism including the internal gear 1121, the sun gear 1122, and the plurality of planetary gears 1123 in the pivot mechanism 112 may be configured so that the pivot amount of the outer cylindrical member 111 by a user operation is large and a force (torque) necessary for the operation is small. That is, a gear ratio among the internal gear 1121, the sun gear 1122, and the plurality of planetary gears 1123 may be set so that the pivot amount of the sun gear 1122 is larger than the moving amount of each of the plurality of planetary gears 1123 at the time of revolution. This allows the user to confirm that connection by the connection mechanism 11 is executed by himself/herself with a relatively small force, which is advantageous in improving usability.

<Example of System Configuration of Robot System>

Figure 9:
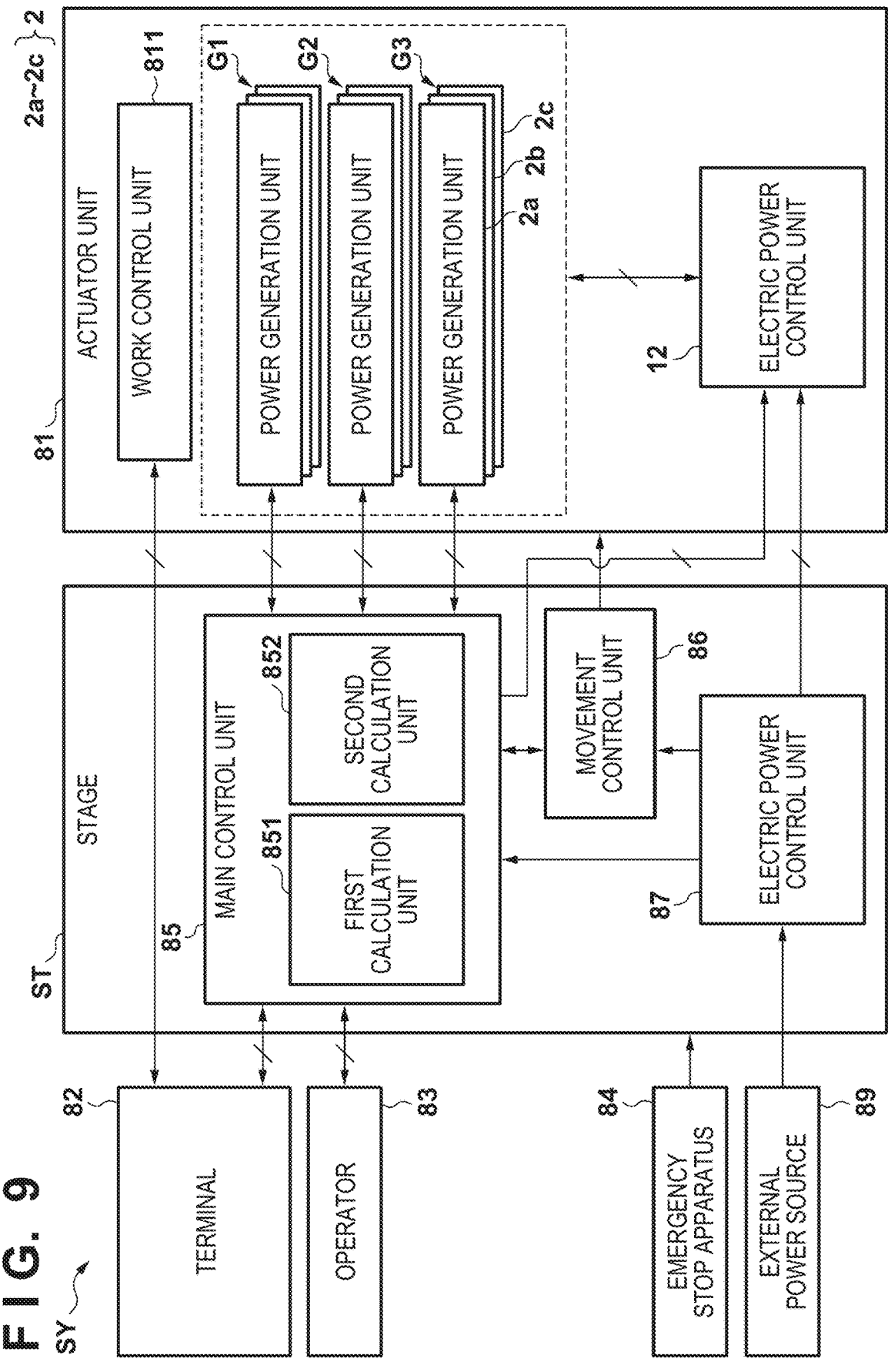
FIG. 9 is a system block diagram of the robot system.

FIG. 9 is a system block diagram showing an example of the configuration of the robot system SY. In this example, in addition to the stage ST, the robot system SY includes an actuator unit 81, a terminal 82, an operation element 83, an emergency stop apparatus 84, and the external power supply 89.

The driving apparatus 1 and the wire driving manipulator OB form part of the actuator unit 81. The actuator unit 81 further includes a work control unit 811 for performing driving control of a work unit (for example, a camera) provided distally from the movable portions 91 of the wire driving manipulator OB.

The terminal 82 is, for example, a PC (Personal Computer) including a display, a keyboard, and a mouse, and is connected to the stage ST in this embodiment. The terminal 82 is connected to the work control unit 811 via the stage ST, and the user can confirm work contents (for example, a video).

The operation element 83 is, for example, a joystick controller or the like, and is connected to the stage ST in this embodiment. Driving control of the wire driving manipulator OB is performed mainly based on an operation input to the operation element 83.

The emergency stop apparatus 84 includes a switch that can be pressed in case of emergency, can stop a work by the robot system SY in response to the pressing of the switch, and is connected to the stage ST in this embodiment.

The stage ST includes the main control unit 85, a movement control unit 86, and a power control unit 87.

In this example, the main control unit 85 is a dual-core processor including a first arithmetic unit 851 and a second arithmetic unit 852. The arithmetic unit 851 mainly analyzes an operation input to the operation element 83, and generates, based on the result of the analysis, a signal for performing driving control of the wire driving manipulator OB. The arithmetic unit 852 generates, based on the signal from the arithmetic unit 851, a signal for performing driving control of the plurality of power generation units 2. The main control unit 85 can exchange a signal with the control unit 10 of each power generation unit 2 shown in FIG. 10 (to be described later), and the thus generated signal is output to the control units 10 of the plurality of power generation units 2.

The movement control unit 86 performs driving control of the slider mechanism for reciprocally moving the driving apparatus 1 with respect to the stage ST. Note that the moving amount of the driving apparatus 1 follows a communication instruction from the main control unit 85.

The power control unit 87 generates, based on the power of the external power supply 89, corresponding power to be supplied to each element of the stage ST including the main control unit 85 and the movement control unit 86. The power control unit 87 generates power to be supplied to the power control unit 12.

As described above (see FIG. 1), the wire driving manipulator OB includes the N movable portions 91 (in this example, N=3), and each movable portion 91 is movable based on three kinds of control signals for pushing/pulling the three kinds of wires 911a to 911c, respectively. The driving apparatus 1 can change the posture of the wire driving manipulator OB based on the plurality (in this example, 3×N (=9)) of powers, and includes the plurality (in this example, nine) of power generation units 2 corresponding to them.

The plurality of power generation units 2 are divided into N groups corresponding to the N movable portions 91, and the group corresponding to each movable portion 91 includes three power generation units 2. The N groups are represented as a first group G1, a second group G2, and a third group G3 in FIG. 9 where N=3.

Figure 10:
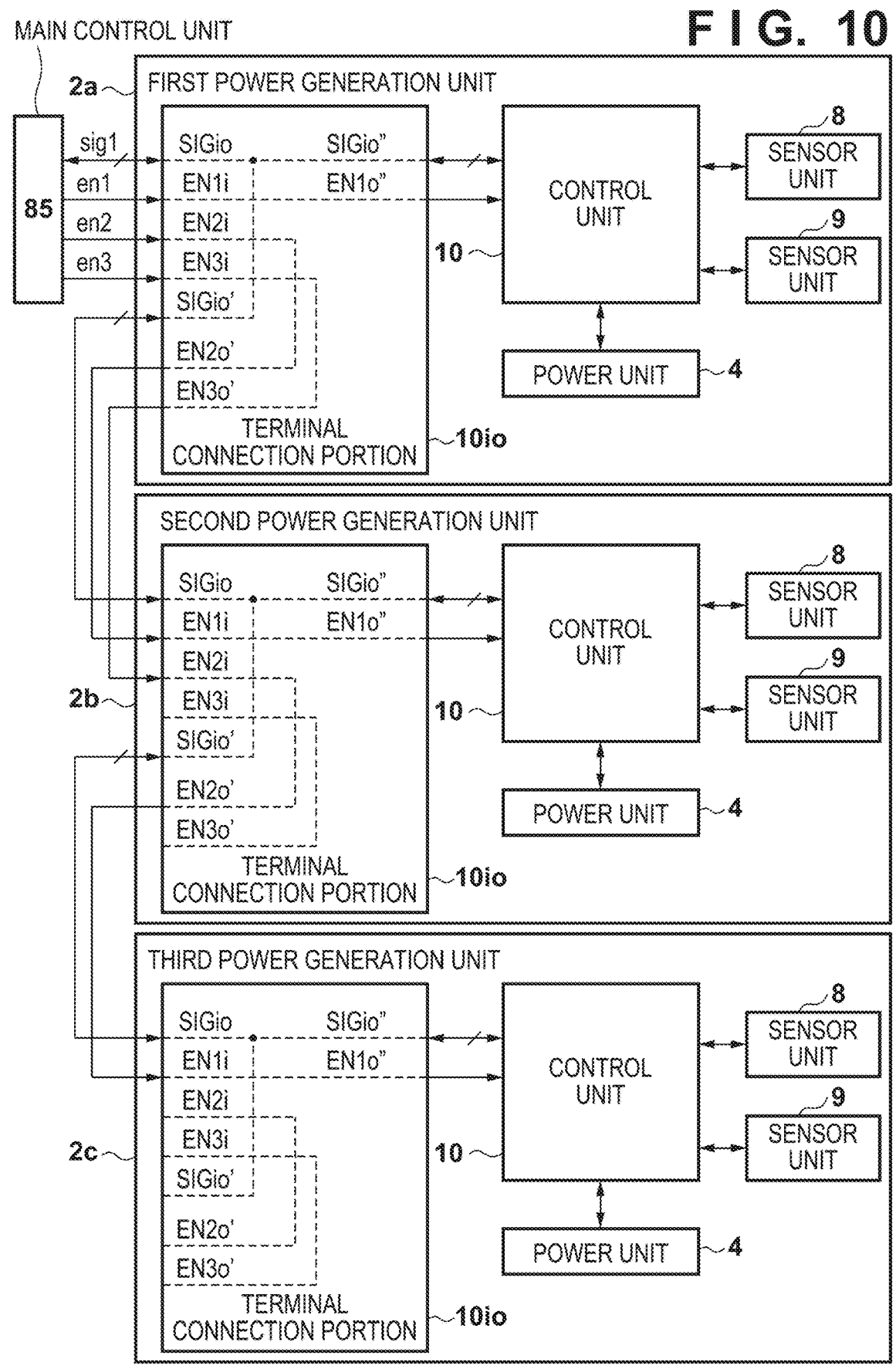
FIG. 10 is a block diagram showing a connection form between the power generation units.

FIG. 10 is a block diagram showing a connection form between the power generation units 2 in the group G1 (the connection form is the same for the groups G2 and G3). The three power generation units 2 included in the group G1 are referred to as power generation units 2a, 2b, and 2c for distinction. All of the power generation units 2a, 2b, and 2c have the same structure but the connection forms of signal lines are different from each other.

The connection of the signal lines is implemented by a terminal connection portion 10io. Note that the terminal connection portion 10io may be arranged on a substrate that forms the control unit 10, and formed integrally with or separately from the control unit 10. In this example, the terminal connection portion 10io includes input/output terminals SIGio, SIGio', and SIGio", input terminals EN1i, EN2i, and EN3i, and output terminals EN2o', EN3o', and EN1o".

Each of the input/output terminals SIGio, SIGio', and SIGio" allows a signal to be input/output (transmitted bidirectionally). A target to be input/output is a signal group as a source of the three kinds of control signals for pushing/pulling the three kinds of wires 911a to 911c, or data or information (to be referred to as an "instruction signal" in the following description).

With respect to the power generation unit 2a, the input/output terminal SIGio of the terminal connection portion 10io is connected to the main control unit 85, and the input/output terminal SIGio" is connected to the control unit 10. On the other hand, the input/output terminal SIGio' is connected to the input/output terminal SIGio of the terminal connection portion 10io of the power generation unit 2b.

With respect to the power generation unit 2b, the input/output terminal SIGio" is connected to the control unit 10, and the input/output terminal SIGio' is connected to the input/output terminal SIGio of the terminal connection portion 10io of the power generation unit 2c.

Then, with respect to the power generation unit 2c, the input/output terminal SIGio" is connected to the control unit 10, and the input/output terminal SIGio' is in an open state.

Each of the input terminals EN1i, EN2i, and EN3i allows a signal to be input. A target to be input is an enable signal indicating whether it is possible to execute an operation. The signal which is input to the input terminal EN1i is output as the enable signal of the output terminal EN1o, that enables its control unit 10. Also, the signals which are input to the input terminals EN2i and EN3i are output from the terminal connection portion 10io as the enable signals of the output terminals EN2o' and EN3o', respectively.

With respect to the power generation unit 2a, the input terminals EN1i, EN2i, and EN3i of the terminal connection portion 10io are connected to the main control unit 85, and the output terminal EN1o" is connected to the control unit 10. On the other hand, the output terminal EN2o' is connected to the input terminal EN1i of the terminal connection portion 10io of the power generation unit 2b, and the output terminal EN3o' is connected to the input terminal EN2i of the terminal connection portion 10io of the power generation unit 2b.

With respect to the power generation unit 2b, the output terminal EN1o" of the terminal connection portion 10io is connected to the control unit 10, and the input terminal EN3i and the output terminal EN3o' are in an open state. On the other hand, the output terminal EN2o' is connected to the input terminal EN1i of the terminal connection portion 10io of the power generation unit 2c.

With respect to the power generation unit 2c, the output terminal EN1o" of the terminal connection portion 10io is connected to the control unit 10, and the input terminals EN2i and EN3i and the output terminals EN2o' and EN3o' are in an open state.

In this connection form, an instruction signal sig1 from the main control unit 85 is sequentially transferred to the control units 10 of the power generation units 2a, 2b, and 2c. The main control unit 85 outputs, as enable signals en1, en2, and en3, signals each indicating which of the power generation units 2a, 2b, and 2c is caused to execute an operation, together with the instruction signal sig1. For example, when the enable signal en1 is at H level (high level), this indicates that the power generation unit 2a is caused to execute an operation, and when the enable signal en1 is at L level (low level), this indicates that execution of the operation is suppressed. The enable signals en2 and en3 correspond to the power generation units 2b and 2c, respectively, and operate at logic levels, similar to the enable signal en1.

For example, in a case where the instruction signal sig1, the enable signal en1 at H level, and the enable signals en2 and en3 at L level are output, the power generation unit 2a generates, based on the instruction signal sig1, a control signal for pushing/pulling the wire 911a.

Similarly, in a case where the instruction signal sig1, the enable signal en2 at H level, and the enable signals en1 and en3 at L level are output, the power generation unit 2b generates, based on the instruction signal sig1, a control signal for pushing/pulling the wire 911b.

Furthermore, in a case where the instruction signal sig1, the enable signal en3 at H level, and the enable signals en1 and en2 at L level are output, the power generation unit 2c generates, based on the instruction signal sig1, a control signal for pushing/pulling the wire 911c.

Each of the control units 10 of the power generation units 2a, 2b, and 2c can output the detection results of the position sensor 8 and the external force detection sensor 9 as part of a response signal to the instruction signal sig1, and feed them back to the main control unit 85. In this case, for example, when the enable signal en1 is at H level and the enable signals en2 and en3 are at L level, the detection results in the power generation unit 2a are fed back as the response signal of the power generation unit 2a to the main control unit 85.

In this connection form, the power generation units 2a to 2c can have the same structure, and for example, each of the power generation units 2a to 2c can easily be replaced by the power generation unit 2. This connection form can relatively easily be implemented by adjusting connection between the power generation units 2a to 2c and the main control unit 85, for example, by preparing specified connection cables (or signal lines) in advance. This connection form is represented as daisy chain connection.

A connection cable that can implement daisy chain connection can be held by, for example, being wound around the corresponding extending portion 195. Each extending portion 195 need only have a shape that can hold a connection cable, and has a T-like shape (see, for example, FIGS. 4 and 5) in this embodiment, but may have another shape. Thus, when replacing some/all of the power generation units 2a to 2c, the user removes only the connection cable of the power generation unit 2 to be replaced, and then attaches the new power generation unit 2 to insert the connection cable. If two or more power generation units 2 are replaced, it is possible to prevent the connection cables from being crossed by replacing them one by one.

According to this embodiment, it is possible to implement, by a relatively simple structure, the driving apparatus 1 that can individually control the plurality of powers generated by the plurality of power generation units 2. Along with this, it is also possible to make it relatively easy to perform handling of the driving apparatus 1, such as assembly, disassembly, and maintenance.

Second Embodiment

Figure 11:
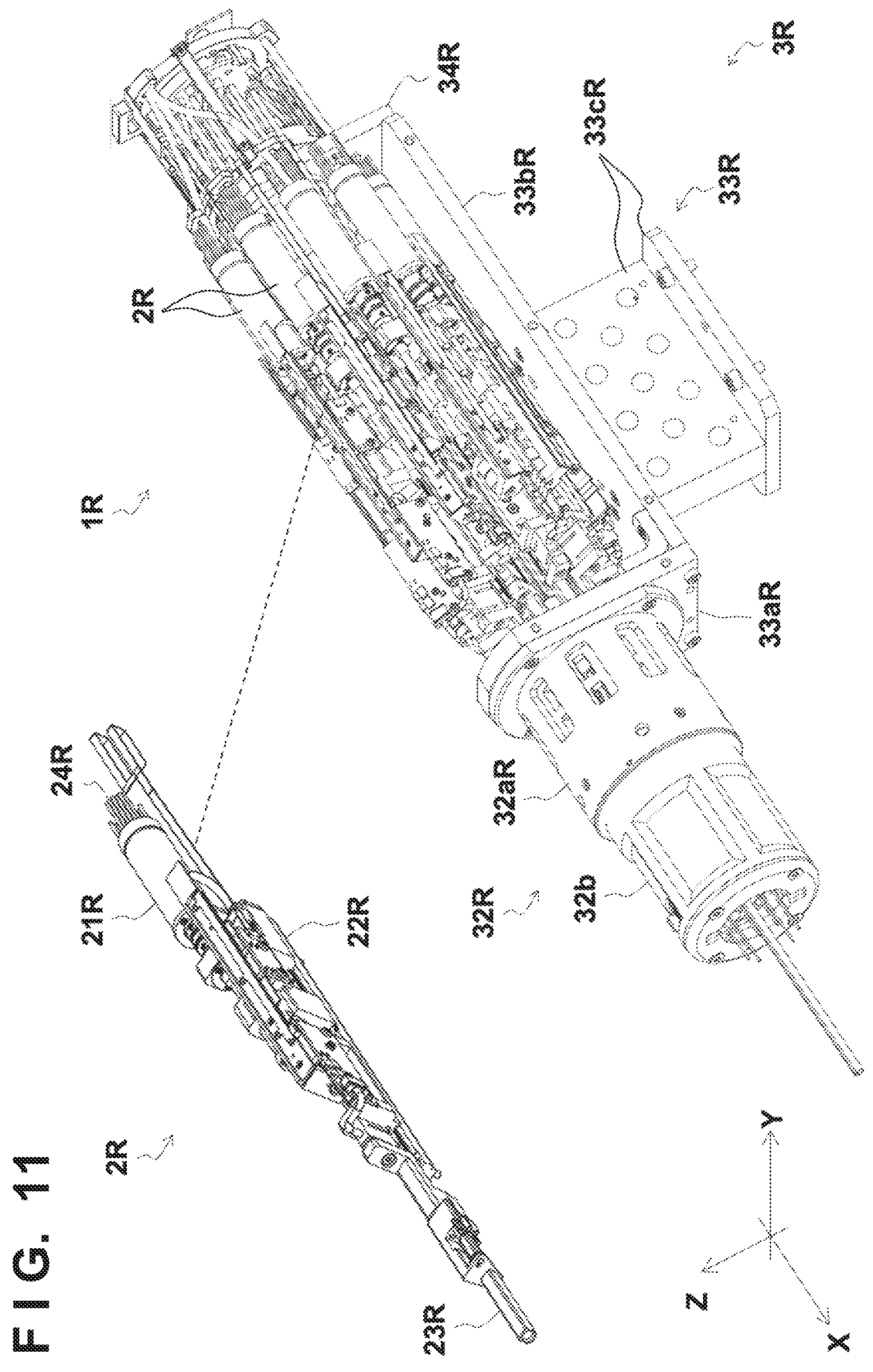
FIG. 11 is an overall perspective view showing an example of the structure of a driving apparatus according to an embodiment.

A structure applicable to the robot system SY is not limited to the driving apparatus 1 and various modifications/changes can be made without departing from the scope. FIG. 11 is an overall perspective view of a driving apparatus 1R according to the second embodiment. The driving apparatus 1R includes a plurality of power generation units 2R and a structure 3R for supporting them. The driving apparatus 1R extends in a long shape. In FIG. 11, the length direction or the longitudinal direction is the X direction, the width direction or the widthwise direction is the Y direction, and the height direction or the vertical direction is the Z direction (the same applies to other drawings to be described later).

Although details will be described later, the one or more power generation units 2R (in this example, the plurality of power generation units 2R) can be detached from the structure 3R.

FIG. 12 is an overall perspective view of the structure 3R in a state in which some of the power generation units 2R are detached.

Each of the power generation units 2R includes an electric motor 21R, a motor driver 22R, a power output portion 23R, and an electrical connection portion 24R. The power generation unit 2R can individually generate one or more powers. Although details will be described later, in each power generation unit 2R, the motor driver 22R performs driving control of the electric motor 21R based on power and a signal received via the electrical connection portion 24R, and outputs power thus generated by the electric motor 21R from the power output portion 23R.

The power generation unit 2R may be represented as an actuator unit or the like or may simply be represented as an actuator or the like. The power output portion 23R may simply be represented as the output portion 23R.

The structure 3R includes a shaft body 31R, a connection portion 32R, a support body 33R, and a support plate 34R. Note that the connection portion 32R is not illustrated in FIG. 12 for the sake of easy understanding of the structure.

The shaft body 31R is a rod-shaped member extending in the X direction, and the power generation unit 2R can individually be attached to/detached from the shaft body 31R on its periphery. For example, each power generation unit 2R can be fixed to the shaft body 31R by one or more fixing portions 311R.

To stabilize fixing of each power generation unit 2R, two or more fixing portions 311R may be provided in the shaft body 31R, and four fixing portions 311R are provided in this embodiment. As examples of the fixing portions 311R, a pin, a pin hole, a screw hole, and the like are used in combination. For example, it is possible to align the power generation unit 2R using pins and/or pin holes, and to confirm and fix the position of the power generation unit 2R by fastening using screw holes. That is, the two or more fixing portions 311R include fastening portions such as screw holes, and may additionally include an alignment portion such as a pin and a pin hole.

FIG. 17 is a schematic view showing a detailed structure of the power generation unit 2R. As shown in a schematic side view of FIG. 17, the power generation unit 2R includes a fixing unit 2aR fixed to the shaft body 31R, and a driving unit 2bR that can relatively move (slide) with respect to the fixing unit 2aR, and the units 2aR and 2bR are connected as indicated by a broken line in FIG. 17. The electric motor 21R and the electrical connection portion 24R are installed on the side of the fixing unit 2aR, and the power output portion 23R is installed on the side of the driving unit 2bR. The motor driver 22R can be installed on the side of the fixing unit 2aR but may be at least partially installed on the side of the driving unit 2bR. In this case, the units 2aR and 2bR can electrically be connected by a flexible cable laid between the units 2aR and 2bR.

As shown in an enlarged perspective view of FIG. 17, a screw hole 311aR and a pin 311bR are provided as the fixing portions 311R in the shaft body 31R. The fixing unit 2aR includes a screw insertion hole H21R and a pin insertion hole H22R. Thus, the fixing unit 2aR is positioned by the pin 311bR with respect to the shaft body 31R, and can be fixed by a screw 9R at the screw hole 311aR.

The driving unit 2bR includes an insertion hole H23R that can receive both a screw portion 91R and a screw head 92R of the screw 9R. This can attach the power generation unit 2R in a state in which the driving unit 2bR is slid with respect to the fixing unit 2aR and the screw insertion holes H21R and H23R overlap each other.

Referring back to FIG. 11, the connection portion 32R is used to connect the power output portions 23R of one or more of the power generation units 2R to a predetermined driving target, and includes a fixed grip portion 32aR and a pivoting grip portion 32bR.

The fixed grip portion 32aR is fixed to the shaft body 31R, and can be gripped by the user. The pivoting grip portion 32bR can pivot with respect to the fixed grip portion 32aR, and can be gripped by the user. In a state in which the driving target is inserted into the connection portion 32R and connected to the driving apparatus 1R, the user can grip and pivot the pivoting grip portion 32bR with the other hand (for example, the right hand) while gripping the fixed grip portion 32aR with one hand (for example, the left hand). The driving target is locked by the pivot of the pivoting grip portion 32bR in one direction, thereby implementing connection of the power generation unit 2R to the driving target. The driving target is unlocked by the pivot in an opposite direction, thereby making it possible to detach the driving target.

Note that an example of the driving target is a manipulator that can variously be deformed based on the power, and is a catheter in a case where, for example, the driving apparatus 1R is a medical apparatus.

Figure 13:
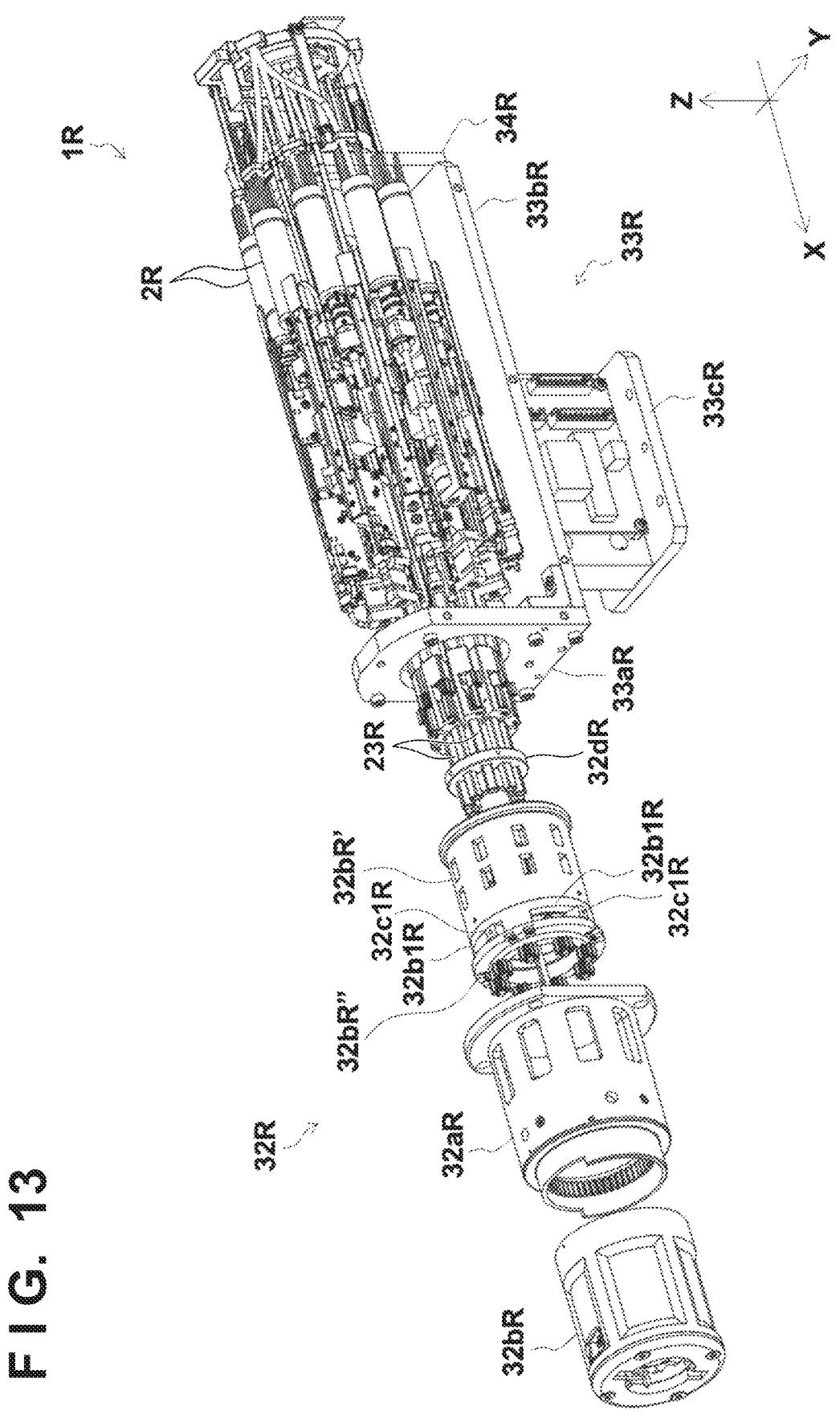
FIG. 13 is an exploded perspective view showing an example of the internal structure of a connection portion.

FIG. 13 is an exploded perspective view obtained by disassembling the elements/components forming the connection portion 32R in the X direction, and shows the internal structure of the fixed grip portion 32aR and the pivoting grip portion 32bR. The fixed grip portion 32aR includes the pivoting components 32bR' and 32bR". The pivoting grip portion 32bR is connected to the fixed grip portion 32aR. Although a detailed description will be omitted, the pivoting components 32bR' and 32bR" form a locking mechanism for locking the driving target when the pivoting grip portion 32bR pivots.

The connection portion 32R further includes an annular fixed portion 32dR and an extending fixed portion 32cR. The annular fixed portion 32dR bundles and fixes the power output portions 23R of the power generation units 2R, and the extending fixed portion 32cR is located between the pivoting components 32bR' and 32bR".

Figure 14:
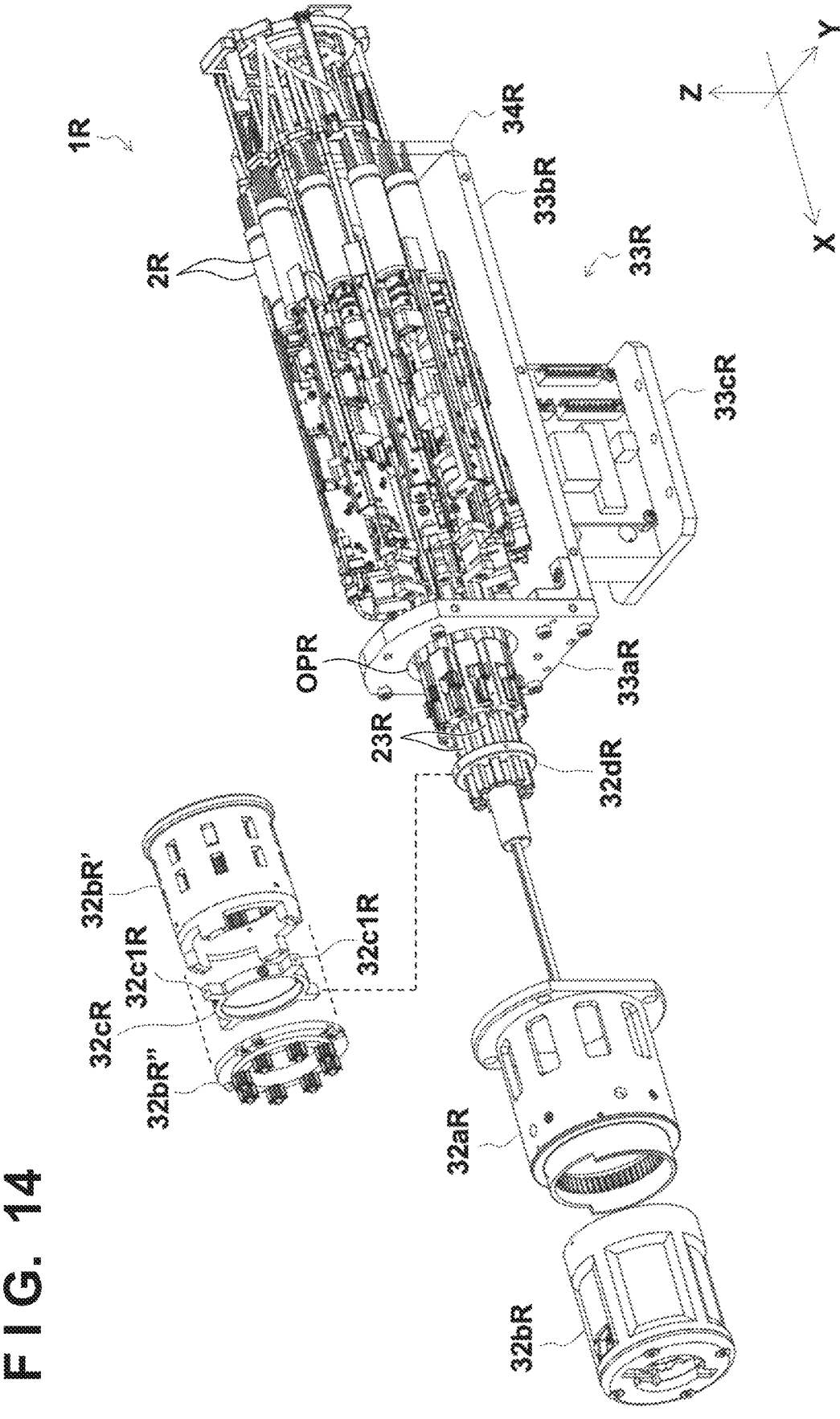
FIG. 14 is an exploded perspective view showing details of the internal structure of the connection portion.

FIG. 14 is an exploded perspective view obtained by further disassembling some of the elements/components in the X direction, and is an overall perspective view of the extending fixed portion 32cR between the pivoting components 32bR' and 32bR".

The annular fixed portion 32dR bundles and fixes the power output portions 23R of the power generation units 2R. That is, the power generation unit 2R is attached to the shaft body 31R so that the corresponding power output portion 23R is inserted into the annular fixed portion 32dR. The annular fixed portion 32dR is located inside the pivoting components 32bR', and is fixed to the fixed grip portion 32aR (also to the shaft body 31R), and the position is fixed regardless of the pivot of the pivoting grip portion 32bR.

In this embodiment, the annular fixed portion 32dR is fixed to a position at which the fixed grip portion 32aR and the pivoting grip portion 32bR partially overlap each other, when viewed in the Y direction/Z direction. The annular fixed portion 32dR may be part of the fixed grip portion 32aR.

The extending fixed portion 32cR is connected to the annular fixed portion 32dR, and is fixed on the outer periphery of the annular fixed portion 32dR in this example. In the extending fixed portion 32cR, one or more (in this example, four) extending portions 32c1R extending outward are provided (see FIG. 14). Also, by the pivoting components 32bR' and 32bR" being connected to each other, the slit holes 32b1R is formed, and the one or more (in this example, four) slit holes 32b1R are formed so as to correspond to the one or more extending portions 32c1R (see FIG. 13).

The slit hole 32b1R receives the corresponding extending portion 32c1R. The pivoting grip portion 32bR is configured so that the extending portion 32c1R slides along the corresponding slit hole 32b1R when the pivoting grip portion 32bR pivots, and can thus move relative to the extending portion 32c1R. This structure restricts the pivot range (movable range) of the pivoting grip portion 32bR.

The support body 33R is configured to support the shaft body 31R together with the power generation units 2R. In this embodiment, the support body 33R includes a side plate portion 33aR that receives the power output portions 23R of the power generation units 2R by an opening OPR and fixes them, a bottom plate portion 33bR that fixes the side plate portion 33aR, and a support portion 33cR that supports the bottom plate portion 33bR from below. The support body 33R can be placed on a predetermined placing table, cart, or the like, and can additionally be fixed. Note that the side plate portion 33aR, the bottom plate portion 33bR, and the support portion 33cR may be disassembled but may be formed integrally.

The support plate 34R is detachably fixed to the support body 33R, and supports the shaft body 31R on the opposite side of the plurality of power output portions 23R of the power generation units 2R (that is, on the opposite side of the side plate portion 33aR).

FIG. 15 is an overall perspective view of the support body 33R in a state in which the support plate 34R is detached together with the plurality of power generation units 2R.

The support plate 34R can be fixed to the support body 33R by fastening. With this structure, the plurality of power generation units 2R attached to the shaft body 31R can collectively be detached together with the shaft body 31R by detaching the support plate 34R from the support body 33R. Note that the support plate 34R and the shaft body 31R may be disassembled but may be formed integrally.

In this structure, the driving target connected to the driving apparatus 1R is driven based on the plurality of powers respectively received from the plurality of power generation units 2R, and various modifications can be made. Examples of modifications are change of the shape, change of the direction, and change of the posture.

In each power generation unit 2R, the power generated by the electric motor 21R based on driving control of the motor driver 22R is transmitted to the power output portion 23R and then output. For example, the electric motor 21R is connected to a ball screw, and can rotate a screw shaft to reciprocally move, in the X direction, a moving body 28R engaging with the screw shaft. This structure makes it possible to move the moving body 28R in the X direction to output power corresponding to the position of the moving body 28R, thereby transform the driving target.

Figures 16A, 16B:
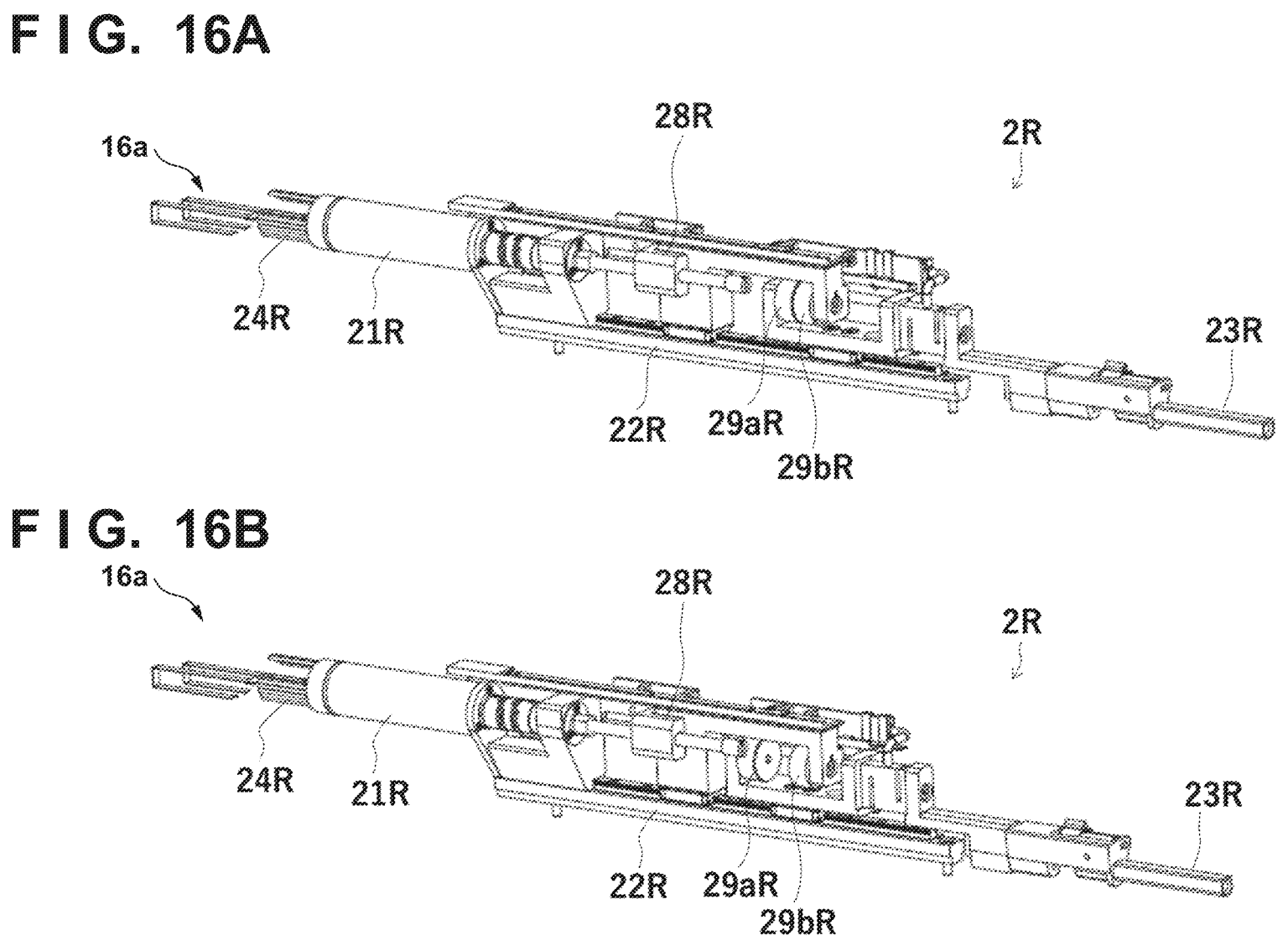

FIGS. 16A and 16B are overall perspective views of the single power generation unit 2R.

Magnets 29aR and 29bR are magnetically connected and arranged in a power transmission path for transmitting the power of the electric motor 21R to the power output portion 23R (see FIG. 16A). In a case where a load equal to or more than a reference is applied to the power output portion 23R (for example, a force larger than the magnetic force between the magnets 29aR and 29bR is applied in a direction in which they are separated from each other), the magnets 29aR and 29bR are separated (see FIG. 16B). With this structure, in a case where an unexpected load based on an external cause is applied to the driving target, the magnets 29aR and 29bR are separated from each other to interrupt the output of the power of the electric motor 21R. In response to this, the user can cope with, for example, maintenance or the like based on the cause of the unexpected load.

Note that each of the shaft body 31R, the support body 33R, and the support plate 34R can be required to have relatively high rigidity but a material that is substantially non-magnetic may be used so as to not receive the influence of the magnets 29aR and 29bR, and for example, aluminum, a resin, or the like can be used.

Others

In each of the embodiment s, the name of each element is expressed based on the main function but the function described in the embodiment may be a sub-function. The present disclosure is not strictly limited to this. This expression can be replaced by a similar expression. To the same effect, a term "unit or portion" may be replaced by "tool", "component", "member", "structure", "assembly", or the like, or may be omitted.

Two or more elements exemplified as selectable in the embodiment are not strictly limited to the example, and may be arbitrarily combined. For example, each of the two or more exemplified elements may be additionally or alternatively selected. As an example, when arbitrarily combining two elements A and B, to indicate either "only A", "only B", or "both A and B", an expression "A and/or B" or "at least one of A and B" may be used.

SUMMARY

Some features exemplified in each of the embodiments are as follows.

[1] A driving apparatus (1) connectable to a driving target to be driven based on a plurality of powers, comprising:
a shaft body (3) extending in a first direction (X direction); and
a plurality of power generation units (2) configured to generate the plurality of powers, respectively, and detachably attached to a periphery of the shaft body, wherein each power generation unit includes
a power unit (4) configured to generate power,
a sensor unit (8, 9) configured to detect a state of the power generation unit, and
a control unit (10) configured to perform driving control of the power unit and externally output a signal of the sensor unit.

[2] The apparatus according to [1], wherein
each power generation unit further includes a power output unit (7) configured to output the power generated by the power unit, and
the sensor unit includes an external force detection sensor (9) configured to detect an external force applied to the power output unit.

[3] The apparatus according to [1] or [2], wherein
the power output unit is movable with respect to the power unit, and
the sensor unit includes a position sensor (8) configured to detect a position of the power output unit with respect to the power unit.

[4] The apparatus according to any one of [1] to [3], further comprising a connection mechanism (11) configured to connect the plurality of power generation units to the driving target,
wherein the connection mechanism includes an internal gear (1121) with the first direction as a central axis, a sun gear (1122) with the first direction as a central axis including an opening in a central portion, and a plurality of planetary gears (1123) arranged between the internal gear and the sun gear and configured to mesh with the internal gear and the sun gear, and
the driving target is inserted into the opening of the sun gear to be connected to the plurality of power generation units, and the connection is fixed by pivoting the sun gear about the first direction as the central axis.

[5] The apparatus according to [4], wherein a gear ratio among the internal gear, the sun gear, and the plurality of planetary gears is set so that a pivot amount of the sun gear is larger than a moving amount of each of the plurality of planetary gears.

[6] The apparatus according to [4] or [5], further comprising a connection detection sensor (197) configured to detect the connection by the connection mechanism,
wherein the connection mechanism further includes a plate member (1134) configured to pivot by pivoting the sun gear about the first direction as the central axis, and
the connection detection sensor detects the connection based on passing of the plate-shaped member.

[7] The apparatus according to any one of [1] to [6], further comprising:
a support member (194) configured to support the shaft body on one end portion side (−X side end portion); and
a plurality of extending portions (195) extending outward from the support member to respectively correspond to the plurality of power generation units, and each configured to hold a signal line connected to the control unit.

[8] The apparatus according to any one of [1] to [7], wherein each power generation unit is fixed to the shaft body by at least one fixing portion, and is individually detachable from the shaft body.

[9] An inspection system (SY) comprising:
a driving apparatus (1) defined in any one of [1] to [8]; and
a stage (ST) configured to hold the driving apparatus to be reciprocally movable in a first direction.

[10] The system according to [9], wherein
in a case where N is a natural number not less than 2,
a driving target includes N movable portions,
each movable portion is movable based on three kinds of control signals, and
the number of power generation units is 3×N.

[11] The system according to [10], wherein
the stage includes a main control unit (85) configured to exchange a signal with each of control units of the plurality of power generation units, the plurality of power generation units are divided into N groups, and each group includes three power generation units, and the main control unit controls the three power generation units for each group.

[12] The system according to [11], wherein in a case where the three power generation units are represented as a first power generation unit (2*a*), a second power generation unit (2*b*), and a third power generation unit (2*c*), the main control unit outputs, to the control unit of the first power generation unit, an instruction signal for the first power generation unit, the second power generation unit, and the third power generation unit, the control unit of the first power generation unit outputs, to the control unit of the second power generation unit, the instruction signal received from the main control unit, and the control unit of the second power generation unit outputs, to the control unit of the third power generation unit, the instruction signal received from the control unit of the first power generation unit.

[13] The system according to [12], wherein the control unit of the third power generation unit outputs, to the control unit of the second power generation unit, a signal of a sensor unit of the third power generation unit, the control unit of the second power generation unit outputs, to the control unit of the first power generation unit, the signal of the sensor unit of the third power generation unit received from the control unit of the third power generation unit and a signal of a sensor unit of the second power generation unit, and the control unit of the first power generation unit outputs, to the main control unit, the signals of the sensor units of the second power generation unit and the third power generation unit received from the control unit of the second power generation unit and a signal of a sensor unit of the first power generation unit.

[14] The system according to claim 13, wherein the inspection system is a robot system (SY) that sets, as the driving target, a wire driving manipulator whose posture can be changed based on a plurality of powers.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A driving apparatus connectable to a driving target to be driven based on a plurality of powers, comprising:

a shaft body extending in a first direction; and a plurality of power generation units configured to generate the plurality of powers, respectively, and detachably attached to a periphery of the shaft body, wherein each power generation unit includes a power unit configured to generate power, a sensor unit configured to detect a state of the power generation unit, and a control unit configured to perform driving control of the power unit and externally output a signal of the sensor unit.

2. The apparatus according to claim 1, wherein each power generation unit further includes a power output unit configured to output the power generated by the power unit, and the sensor unit includes an external force detection sensor configured to detect an external force applied to the power output unit.

3. The apparatus according to claim 2, wherein the power output unit is movable with respect to the power unit, and the sensor unit includes a position sensor configured to detect a position of the power output unit with respect to the power unit.

4. The apparatus according to claim 1, further comprising a connection mechanism configured to connect the plurality of power generation units to the driving target, wherein the connection mechanism includes an internal gear with the first direction as a central axis, a sun gear with the first direction as a central axis including an opening in a central portion, and a plurality of planetary gears arranged between the internal gear and the sun gear and configured to mesh with the internal gear and the sun gear, and the driving target is inserted into the opening of the sun gear to be connected to the plurality of power generation units, and the connection is fixed by pivoting the sun gear about the first direction as the central axis.

5. The apparatus according to claim 4, wherein a gear ratio among the internal gear, the sun gear, and the plurality of planetary gears is set so that a pivot amount of the sun gear is larger than a moving amount of each of the plurality of planetary gears.

6. The apparatus according to claim 4, further comprising a connection detection sensor configured to detect the connection by the connection mechanism, wherein the connection mechanism further includes a plate-shaped member configured to pivot by pivoting the sun gear about the first direction as the central axis, and the connection detection sensor detects the connection based on passing of the plate-shaped member.

7. The apparatus according to claim 1, further comprising:

a support member configured to support the shaft body on one end portion side; and a plurality of extending portions extending outward from the support member to respectively correspond to the plurality of power generation units, and each configured to hold a signal line connected to the control unit.

8. The apparatus according to claim 1, wherein each power generation unit is fixed to the shaft body by at least one fixing portion, and is individually detachable from the shaft body.

9. An inspection system comprising:

a driving apparatus defined in claim 1; and a stage configured to hold the driving apparatus to be reciprocally movable in a first direction.

10. The system according to claim 9, wherein in a case where N is a natural number not less than 2, a driving target includes N movable portions, each movable portion is movable based on three kinds of control signals, and the number of power generation units is 3×N.

11. The system according to claim 10, wherein the stage includes a main control unit configured to exchange a signal with each of control units of the plurality of power generation units, the plurality of power generation units are divided into N groups, and each group includes three power generation units, and the main control unit controls the three power generation units for each group.

12. The system according to claim 11, wherein in a case where the three power generation units are represented as a first power generation unit, a second power generation unit, and a third power generation unit, the main control unit outputs, to the control unit of the first power generation unit, an instruction signal for the first power generation unit, the second power generation unit, and the third power generation unit, the control unit of the first power generation unit outputs, to the control unit of the second power generation unit, the instruction signal received from the main control unit, and the control unit of the second power generation unit outputs, to the control unit of the third power generation unit, the instruction signal received from the control unit of the first power generation unit.

13. The system according to claim 12, wherein the control unit of the third power generation unit outputs, to the control unit of the second power generation unit, a signal of a sensor unit of the third power generation unit, the control unit of the second power generation unit outputs, to the control unit of the first power generation unit, the signal of the sensor unit of the third power generation unit received from the control unit of the third power generation unit and a signal of a sensor unit of the second power generation unit, and the control unit of the first power generation unit outputs, to the main control unit, the signals of the sensor units of the second power generation unit and the third power generation unit received from the control unit of the second power generation unit and a signal of a sensor unit of the first power generation unit.

14. The system according to claim 13, wherein the inspection system is a robot system that sets, as the driving target, a wire driving manipulator whose posture can be changed based on a plurality of powers.

* * * * *